June 30, 1942.     A. V. HOSE     2,287,936
RELIEF VALVE
Filed July 31, 1940
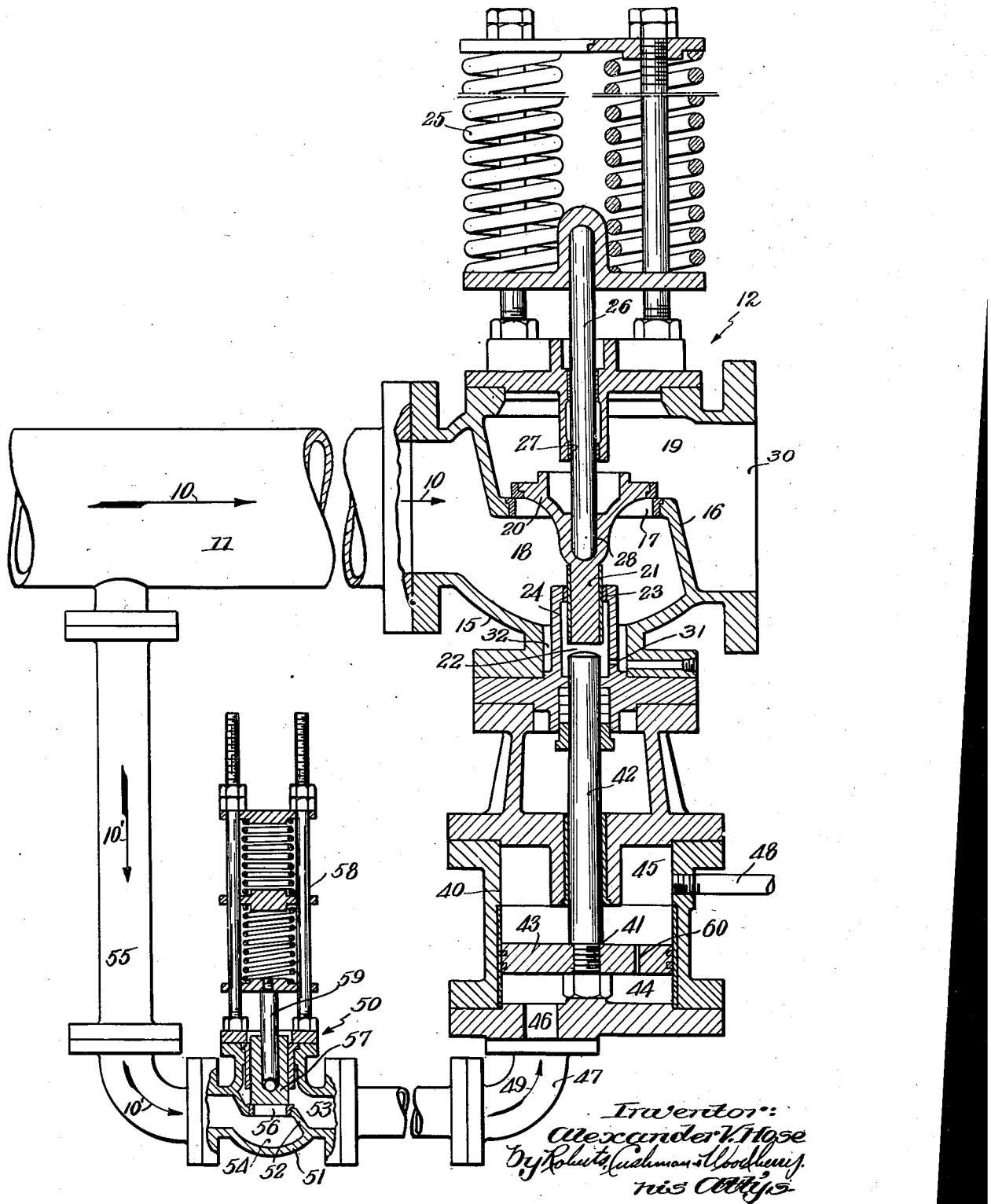

Patented June 30, 1942

2,287,936

UNITED STATES PATENT OFFICE 2,287,936

RELIEF VALVE

Alexander V. Hose, Marblehead, Mass., assignor to Atwood & Morrill Co., Salem, Mass., a corporation of Massachusetts Application July 31, 1940, Serial No. 348,728

7 Claims. (Cl. 137—53)

This invention relates to an improvement in a valve installation and more particularly in the inclusion therein of a relief valve which acts when the pressure exceeds a predetermined amount to permit the escape of the excess steam, such relief valve serving as a safety valve since it comes into operation only after the system has been opened to the atmosphere by the normal action of a standard relief valve and acting to increase the opening of such standard relief valve beyond the normal amount permitted by the loading unit in response to the direct application of pressure thereto and in opposition to the normal resistance of the unit to such movement, such safety relief valve being operated without external means, e. g. electrical control or other auxiliary means, and thus meeting the requirements of the A. S. M. E. code all as hereinafter described and claimed.

The accompanying drawing illustrates a typical installation embodying this invention.

The steam pressure is exerted in the direction of the arrows 10 through the pipe 11 which is normally closed by a spring loaded relief valve 12 of the standard type. The valve 12 includes a suitably formed casing 15 having a partition 16 with a port 17 therein which divides the interior of the casing into compartments 18 and 19. The valve head 20 which normally seats upon the partition 16 to close the port 17 is generally conical in form having a stem 21 which crosses the compartment 18 and enters a chamber 22 through an opening 23 in the wall 24 thereof. As will be pointed out below, the stem 21 is movable and suitable bearing linings are provided upon the stem and the periphery of the opening 23. The head 20 is normally held in its seat by a spring loading unit 25 which is supported upon said casing and acts through a post 26 upon the valve head. The post 26 enters the interior of the casing 10 through an opening 27 in the wall thereof and its inner end is received in a pocket 28 in the valve head 20. The compartment 18 of the valve 12 is in open connection with the pipe 11 and the compartment 19 is open to the atmosphere through an escape outlet 30. The chamber 22 is in direct communication with the compartment 18 through a port 31 and an annular well 32. The well 32 is open to the compartment 18 and to the atmosphere so as to drain off any excess water in the valve.

Under normal conditions when the pressure of the steam exceeds a predetermined maximum the head 20 is raised against the urge of the spring loading unit 25 to permit escape of the steam from the compartment 18 through the port 17 to the compartment 19 and thence through the escape outlet 30 to the atmosphere. Should, however, the steam pressure build up very rapidly the standard relief valve, due to its construction and the urge of the spring unit, cannot open in response to the steam pressure wide enough and rapidly enough to allow for such extreme conditions.

It is the purpose of the safety relief valve feature of this invention to supplement the action of the steam pressure in the compartment 18 and thereby to open the port 17 more widely and more rapidly. Such feature includes a steam cylinder 40 and a piston 41, the head of which is within the cylinder while the stem 42 extends into the chamber 22 of the casing 15 through a suitably packed opening in the base thereof. The stem 42 is of substantially the same diameter as the stem 21 of the valve head and is mounted in axial alignment therewith. The head 43 of the piston 41 divides the chamber 40 into two compartments 44 and 45. A port 46 connects the compartment 44 with a pipe 47 while the other compartment 45 is connected to the atmosphere through an escape outlet 48. A bleed passage 60 through the head 43 leads from one compartment to the other.

The admission of steam through the pipe 47 into the cylinder (see arrow 49) is controlled by a valve 50 which includes a casing 51 divided by a partition 52 into compartments 53, 54 of which the former leads to the pipe 47 while the latter is connected by a pipe 55 to the main steam pipe 11. A port 56 in the partition 52 connects the compartments but is normally closed by the head 57 of the valve 50. A spring loading unit 58 acts through a post 59 to hold the head 57 normally in the port closing position.

The unit 58 is so adjusted that the valve 50 will remain closed until the steam pressure (indicated by the arrows 10') has risen to a level which is set somewhat above the level at which the standard relief valve 12 operates. When that level is reached the valve 50 is opened to permit the steam to enter the cylinder 40 through the pipe 47. The piston 41 is thereupon raised to bring the stem 42 thereof against the stem 21 of the valve head 20 and thus further to open the valve 12 against the urge of the loading unit 25 so that the escape of the steam is made freer.

As soon as the steam pressure drops below the level set for the auxiliary valve 50 the latter closes cutting off the supply of steam to the cylinder 40. The bleed passage 60 in the piston head 43 allows the steam trapped in the pipe 47 and compartment 44 to escape by the closure of the valve 50 to the atmosphere through the compartment 45 and outlet 46. Meanwhile the spring loading unit 25 acts to partially close the valve 12 and through the stem 21 forces the piston 41 to retreat.

While one embodiment of this invention has been shown and described it will be understood that the invention is not limited to such embodiments and that other embodiments may be made without departing from the spirit and scope of the invention as set forth in the following claims.

I claim:

1. In a steam line, a relief valve installation comprising a relief valve which is opened when the steam pressure exceeds a predetermined limit, a second relief valve which is opened when the steam pressure exceeds a limit higher than that assigned to the first relief valve, and a steam cylinder including a piston actuated solely by the steam permitted to flow when the second relief valve is opened for further opening the first relief valve.

2. In a steam line, a relief valve installation comprising a relief valve including a partition having a port therein, a valve head by which said port is closed and means normally holding said valve head in the port closing position, which valve is opened when the steam pressure exceeds a predetermined limit by the direct application of the stem on the valve head, a second relief valve which is opened when the steam pressure exceeds a limit higher than that assigned to the first relief valve and means actuated solely by the steam permitted to flow through the second relief valve for engaging the valve head of the first relief valve independently of the action of the steam thereon and further opening such valve.

3. In a steam line, a relief valve installation comprising a relief valve including a partition having a port therein, a valve head by which said port is closed and means normally holding said valve head in the port closing position, which valve is opened when the steam pressure exceeds a predetermined limit, a second relief valve which is opened when the steam pressure exceeds a limit higher than that assigned to the first relief valve and a steam cylinder including a piston, which is actuated solely by the steam permitted to flow through the second relief valve when opened and a stem carried by the piston which acts upon the actuation of the piston to engage the valve head of the first relief valve to open said valve still further.

4. In a steam line, a relief valve installation comprising a relief valve including a partition having a port therein, a valve head by which said port is closed, and means normally holding said valve head in the port closing position, said valve head having a stem which enters a chamber in the valve, which valve head is raised to open the port when the steam pressure exceeds a predetermined limit and means in said chamber actuated solely when the steam pressure exceeds a limit greater than that assigned to said relief valve to engage the stem of the valve head and raise said valve head to open said port still further.

5. In a steam line, a relief valve installation comprising a relief valve including a partition having a port therein, a valve head by which said port is closed, and means normally holding said valve head in the port closing position, said valve head having a stem which enters a chamber in the valve, which valve head is raised to open the port when the steam pressure exceeds a predetermined limit, a steam cylinder having a piston therein, the stem of which enters said chamber, and a second relief valve which is opened when the steam pressure exceeds a limit higher than that assigned to the first relief valve, and by which steam is admitted into the steam cylinder to act upon the piston and cause the stem of the piston to engage the stem of the valve head of the first relief valve and raise said valve head to open said port still further.

6. In a steam line, a relief valve installation comprising a relief valve including a partition having a port therein, a valve head by which said port is closed, and means normally holding said valve head in the port-closing position, said valve head having a downwardly extending stem, an annular wall in the valve casing, which wall defines a chamber that receives the stem of the valve head, the direction of the travel of the valve head being controlled by said wall, which valve head is raised by steam pressure to open the port when the steam pressure exceeds a predetermined limit, and movable means in said chamber actuated solely by steam pressure when it exceeds a limit greater than the first-mentioned limit to engage the stem of the valve head and positively raise said valve head to open said port still further.

7. In a steam line, a relief valve installation comprising a relief valve including a partition having a port therein, a valve head by which said port is closed, and means normally holding said valve head in the port-closing position, said valve including a chamber in the casing opposite the port in the partition, said valve head having a stem which enters one end of said chamber, which valve head is raised by steam pressure to open the port when the steam pressure exceeds a predetermined limit, a steam cylinder having a piston therein, the stem of which enters the other end of said chamber and is normally out of contact with the stem of the valve head, and a second relief valve which is opened by steam pressure when the steam pressure exceeds a limit higher than that assigned to the first relief valve, and by which steam is admitted into the steam cylinder to act upon the piston and cause the stem of the piston to engage the stem of the valve head of the first relief valve and raise said valve head to open said port still further.

ALEXANDER V. HOSE.